United States Patent
In et al.

(10) Patent No.: US 12,026,384 B2
(45) Date of Patent: Jul. 2, 2024

(54) OPEN BLOCK RELOCATION

(71) Applicant: Western Digital Technologies, Inc., San Jose, CA (US)

(72) Inventors: Ji-Hyun In, Saratoga, CA (US); Yosief Ataklti, Fremont, CA (US); Aajna Karki, San Jose, CA (US); Hongmei Xie, Sunnyvale, CA (US); Xiaoying Li, Fremont, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 155 days.

(21) Appl. No.: 17/896,717

(22) Filed: Aug. 26, 2022

(65) Prior Publication Data

US 2024/0069773 A1   Feb. 29, 2024

(51) Int. Cl.
G06F 3/06   (2006.01)

(52) U.S. Cl.
CPC ............ *G06F 3/064* (2013.01); *G06F 3/0619* (2013.01); *G06F 3/0644* (2013.01); *G06F 3/0679* (2013.01)

(58) Field of Classification Search
CPC ...... G06F 3/064; G06F 3/0619; G06F 3/0644; G06F 3/0679
See application file for complete search history.

(56) References Cited

U.S. PATENT DOCUMENTS

| | | | |
|---|---|---|---|
| 9,460,799 B1 | 10/2016 | Costa et al. | |
| 10,048,863 B1 | 8/2018 | Goss et al. | |
| 10,115,472 B1 | 10/2018 | Camp et al. | |
| 10,956,317 B2 | 3/2021 | Pletka et al. | |
| 11,138,080 B2 * | 10/2021 | Lee | G11C 16/225 |
| 2015/0135039 A1 * | 5/2015 | Mekhanik | G11C 11/5628 365/185.02 |
| 2016/0124679 A1 * | 5/2016 | Huang | G06F 12/0223 711/103 |
| 2020/0174704 A1 * | 6/2020 | Lee | G06F 3/0679 |
| 2020/0310926 A1 * | 10/2020 | Lee | G06F 11/1441 |

FOREIGN PATENT DOCUMENTS

CN   108762670 A   11/2018

* cited by examiner

*Primary Examiner* — Francisco A Grullon
(74) *Attorney, Agent, or Firm* — ARENTFOX SCHIFF LLP

(57) ABSTRACT

Aspects of a storage device including a memory and a controller are provided. In certain aspects, the controller may determine that data stored on a first block satisfies a threshold data-error condition, the data comprising invalid data and valid data. For example, the first block may have a high ratio of valid data to invalid data that satisfies or exceeds a threshold value. In certain aspects, the controller may determine a close block boundary associated with the first block, wherein the close block boundary is configured to bifurcate the first block into a first portion and a second portion, wherein the first portion comprises the data. For example, the controller may determine a boundary defined by a data length, an indirection mapping unit, a physical program boundary, etc.

20 Claims, 7 Drawing Sheets

OPEN BLOCK RELOCATION

BACKGROUND

Field

This disclosure is generally related to electronic devices and more particularly to storage devices and techniques for data relocation.

INTRODUCTION

NAND flash memory is an electrically programmable and erasable non-volatile memory technology that stores one or more bits of data per memory cell as a charge on the floating gate of a transistor or a similar charge trap structure. The amount of charge on the floating gate modulates the threshold voltage of the transistor. By applying a proper read voltage and measuring the amount of current, the programmed threshold voltage of the memory cell can be determined and thus the stored information can be detected.

In a typical implementation, a NAND flash memory array is organized in physical blocks of physical memory, each of which includes multiple physical pages each in turn containing a multiplicity of memory cells. By virtue of the arrangement of the word and bit lines utilized to access memory cells, flash memory arrays have generally been programmed on a physical page basis, but erased on a physical block basis. Physical blocks may be mapped to logical blocks.

Over time, various ones of the logical pages of data programmed into a physical block of a NAND flash memory array may become invalidated, for example if the block has a high bit error rate (BER). In order to recover the use of the storage capacity associated with invalidated logical pages, a conventional flash controller may perform a "relocation process," by which the controller relocates the logical pages from a first physical block to a second available physical block that has previously been erased, and erases the first physical block.

Conventionally, the relocation process may interrupt host input/output processes (e.g., write commands). Thus, if the data being relocated is significant in size, the relocation process may take considerable time and negatively affect host latency.

SUMMARY

Certain aspects are directed to a storage device, comprising a memory and a controller coupled to the memory. In some examples, the controller is configured to determine that data stored on a first block satisfies a threshold data-error condition, the data comprising invalid data and valid data. In some examples, the controller is configured to determine a close block boundary associated with the first block, wherein the close block boundary is configured to bifurcate the first block into a first portion and a second portion, wherein the first portion comprises the data. In some examples, the controller is configured to write generated data to the first portion of the first block, wherein the generated data fills the first portion of the first block to the close block boundary.

Certain aspects are directed to a method for open block data relocation in a memory. In some examples, the method includes determining that data stored on a first block satisfies a threshold data-error condition, the data comprising invalid data and valid data. In some examples, the method includes determining a close block boundary associated with the first block, wherein the close block boundary is configured to bifurcate the first block into a first portion and a second portion, wherein the first portion comprises the data. In some examples, the method includes writing generated data to the first portion of the first block, wherein the generated data fills the first portion of the first block to the close block boundary.

Certain aspects are directed to a storage device. In some examples, the storage device includes means for determining that data stored on a first block satisfies a threshold data-error condition, the data comprising invalid data and valid data. In some examples, the storage device includes means for determining a close block boundary associated with the first block, wherein the close block boundary is configured to bifurcate the first block into a first portion and a second portion, wherein the first portion comprises the data. In some examples, the storage device includes means for writing generated data to the first portion of the first block, wherein the generated data fills the first portion of the first block to the close block boundary.

Certain aspects are directed to a non-transitory computer-readable medium having instructions stored thereon that, when executed by a storage device, cause the storage device to perform operations. In some examples, the operations include determining that data stored on a first block satisfies a threshold data-error condition, the data comprising invalid data and valid data. In some examples, the operations include includes determining a close block boundary associated with the first block, wherein the close block boundary is configured to bifurcate the first block into a first portion and a second portion, wherein the first portion comprises the data. In some examples, the operations include writing generated data to the first portion of the first block, wherein the generated data fills the first portion of the first block to the close block boundary.

Certain aspects are directed to a storage device comprising a memory and a controller coupled to the memory. In some examples, the controller is configured to close a first block based on a satisfies a threshold data-error condition of the first block, wherein the first block comprises invalid data and valid data. In some examples, the controller is configured to open a second block in response to closing the first block. In some examples, the controller is configured to relocate the valid data from the first block to the second block.

Certain aspects are directed to a method for open block data relocation in a memory. In some examples, the method includes closing a first block based on a satisfies a threshold data-error condition of the first block, wherein the first block comprises invalid data and valid data. In some examples, the method includes opening a second block in response to closing the first block. In some examples, the method includes relocating the valid data from the first block to the second block.

Certain aspects are directed to a storage device. In some examples, the storage device includes means for closing a first block based on a satisfies a threshold data-error condition of the first block, wherein the first block comprises invalid data and valid data. In some examples, the storage device includes means for opening a second block in response to closing the first block. In some examples, the storage device includes means for relocating the valid data from the first block to the second block.

Certain aspects are directed to a non-transitory computer-readable medium having instructions stored thereon that, when executed by a storage device, cause the storage device to perform operations. In some examples, the operations include closing a first block based on a satisfies a threshold data-error condition of the first block, wherein the first block comprises invalid data and valid data. In some examples, the operations include opening a second block in response to closing the first block. In some examples, the operations include relocating the valid data from the first block to the second block.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
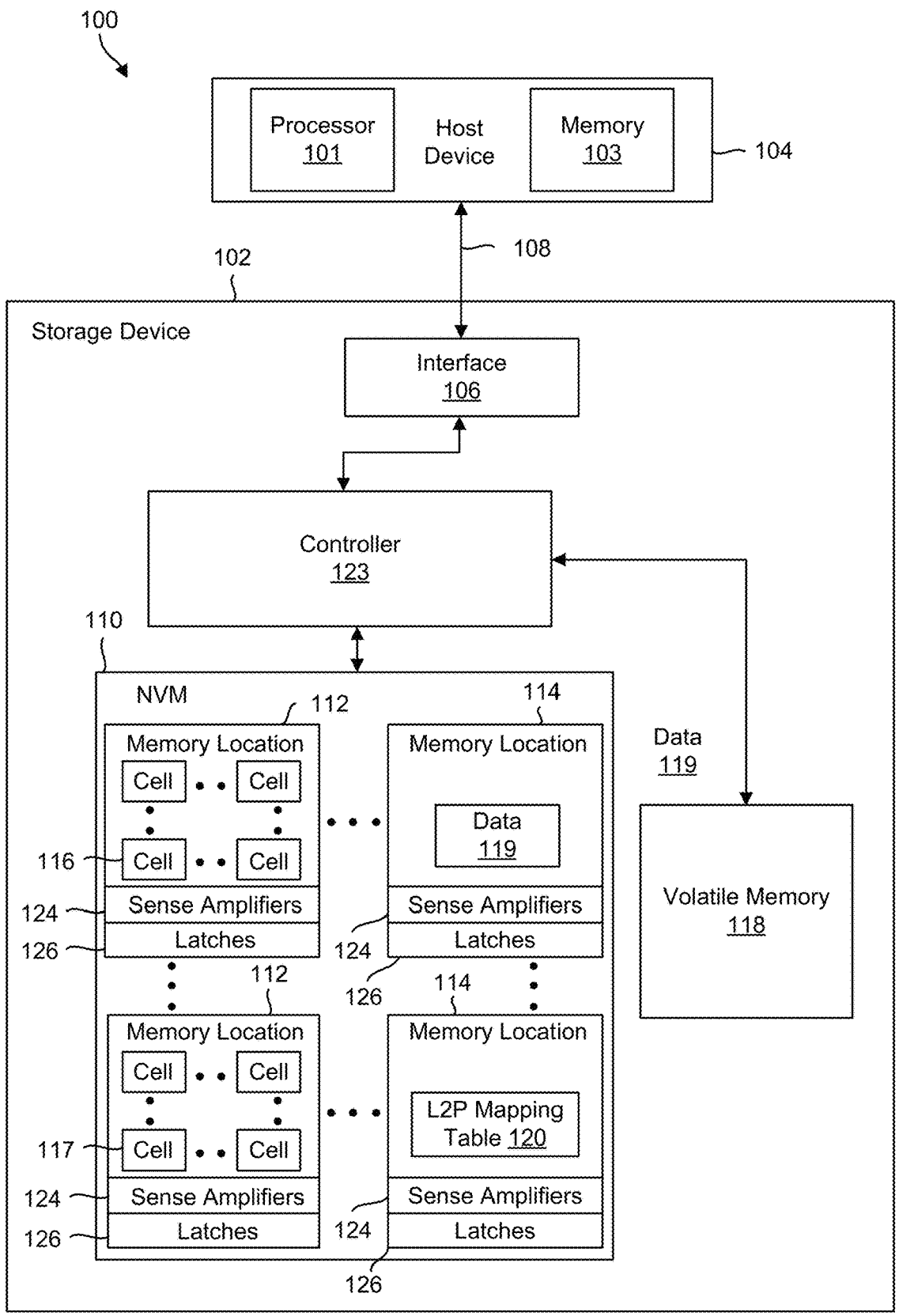
FIG. 1 is an exemplary block diagram illustrating a storage device which communicates with a host device.

Certain aspects of the disclosure are directed to a memory device (e.g., a solid state drive) having a controller. The controller and/or a flash translation layer (FTL) may be configured to perform a relocation process, wherein data contained in a first block is relocated to a healthy, second block. In some examples, such a relocation process may be triggered by a determination that the first block has a relatively high error rate (e.g., a block error rate (BER) that satisfies a threshold condition). Accordingly, if the first block has a BER that is high enough to satisfy the threshold condition, the controller may determine to perform the relocation process to move data from the first block to the second block.

In a relocation process, a data can be moved from the first block to the second block even if the first block is still open (e.g., able to have data written to it), but in some examples, there may not be another block (other than the first block) that is open. For example, software may limit the amount of memory resources that are open, and thus, may not allow for multiple open blocks. In such an example, the first block may need to be closed before the new, second block can be opened, and data moved to the second block from the first block. In some examples, the first block must be closed before another block can be opened. In some examples, this means that the storage capacity of the first block must be substantially used. However, if the capacity of the first block is fully or mostly used, the amount of time required to move data from the first block to the second block will be much higher than if the capacity of the first block is only partially used. Moreover, the relocation process may copy all the data, including invalid data, from the first block and write it to the second block. This may cause the relocation process to take more time than if only the valid data was moved to the second block.

Accordingly, certain aspects of the disclosure are directed to techniques for relocation of data stored in the first block, wherein the capacity of the first block is partially filled with data up to partial close block boundary. In some examples, a block may have one or more partial close block boundaries. In some examples, the block may be completely closed (e.g., no new data may be written to the block), or the block may be partially closed (e.g., new data may be written to pages that proceed from the partial close block boundary, whereas pages prior to the boundary are closed). In such an example where the block is only partially closed, the host may continue to write data to the open portions of the block. This allows for uninterrupted write commands while a new block is opened.

The partial close block boundary, which is lower than the end of the block, may be defined for the open block. The boundary may be chosen such that is aligns with at least one of an ECC/LDPC/XOR data length, an FTL indirection mapping unit, an SLC/MLC/TLC/QLC NAND physical program boundary, and/or a reverse mapping table unit. The FTL may fill the block with dummy data up to the partial close block boundary and close the block when an open block needs to be relocated. Once the FTL closes the block partially, then the FTL may accept host writes and use a new open block to accept the host writes. The FTL may also move only the valid data from the partially closed block to the new block prior to erasing the closed block in a garbage collection function.

In some examples, the controller may be configured to determine an extent to which the block is occupied by data (e.g., the extent to which the capacity of the block is filled). If the block is partially filled with data, the controller may determine if the data reaches a partial close block boundary. If the data does not reach the boundary, then the controller may write dummy data to the block until the data capacity of the block reaches the boundary. It should be noted that the boundary is a partial close block boundary, meaning that the boundary represents less than all of the storage space available in the block.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

In the following detailed description, various aspects of a storage device in communication with a host will be presented. These aspects are well suited for flash storage devices, such as SSDs, USB and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. At least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magneto-resistive random-access memory (MRAM) devices, ferroelectric random-access memory (F-RAM), and any other type of non-volatile memory devices. In other examples, the host memory 103 may include volatile memory, such as random-access memory (RAM), dynamic random-access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host 104 using, for example, cellular communication (e.g., 5G NR, 4G LTE, 3G, 2G, GSM/UMTS, CDMA One/CDMA2000, etc.), wireless distribution methods through access points (e.g., IEEE 802.11, WiFi, HiperLAN, etc.), Infrared (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

The storage device 102 includes a memory. For example, in the exemplary embodiment of FIG. 1, the storage device 102 may include a non-volatile memory (NVM) 110 for persistent storage of data received from the host 104. The NVM 110 can include, for example, flash integrated circuits, NAND memory (e.g., SLC memory, MLC memory, TLC memory, QLC memory, PLC memory, or any combination thereof), or NOR memory. The NVM 110 may include a plurality of memory locations 112 which may store system data for operating the storage device 102 or user data received from the host for storage in the storage device 102. For example, the NVM may have a cross-point architecture including a 2-D NAND array of memory locations 112 having n rows and m columns, where m and n are predefined according to the size of the NVM. In the exemplary embodiment of FIG. 1, each memory location 112 may be a die 114 including multiple planes each including multiple blocks of multiple cells 116. Alternatively, each memory location 112 may be a plane including multiple blocks of the cells 116. The cells 116 may be single-level cells, multi-level cells, triple-level cells, quad-level cells, and/or penta-level cells, for example. Other examples of memory locations 112 are possible; for instance, each memory location may be a block or group of blocks. Each memory location may include one or more blocks in a 3-D NAND array. Each memory location 112 may include one or more logical blocks which are mapped to one or more physical blocks. Alternatively, the memory and each memory location may be implemented in other ways known to those skilled in the art.

The storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a write buffer or a read buffer for temporarily storing data. While FIG. 1 illustrates the volatile memory 118 as being remote from a controller 123 of the storage device 102, the volatile memory 118 may be integrated into the controller 123.

The memory (e.g., NVM 110) is configured to store data 119 received from the host device 104. The data 119 may be stored in the cells 116 of any of the memory locations 112. As an example, FIG. 1 illustrates data 119 being stored in different memory locations 112, although the data may be stored in the same memory location. In another example, the memory locations 112 may be different dies, and the data may be stored in one or more of the different dies.

Each of the data 119 may be associated with a logical address. For example, the NVM 110 may store a logical-to-physical (L2P) mapping table 120 for the storage device 102 associating each data 119 with a logical address. The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a logical block address (LBA) associated with each memory location 112 in the NVM where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM.

Figure 2:
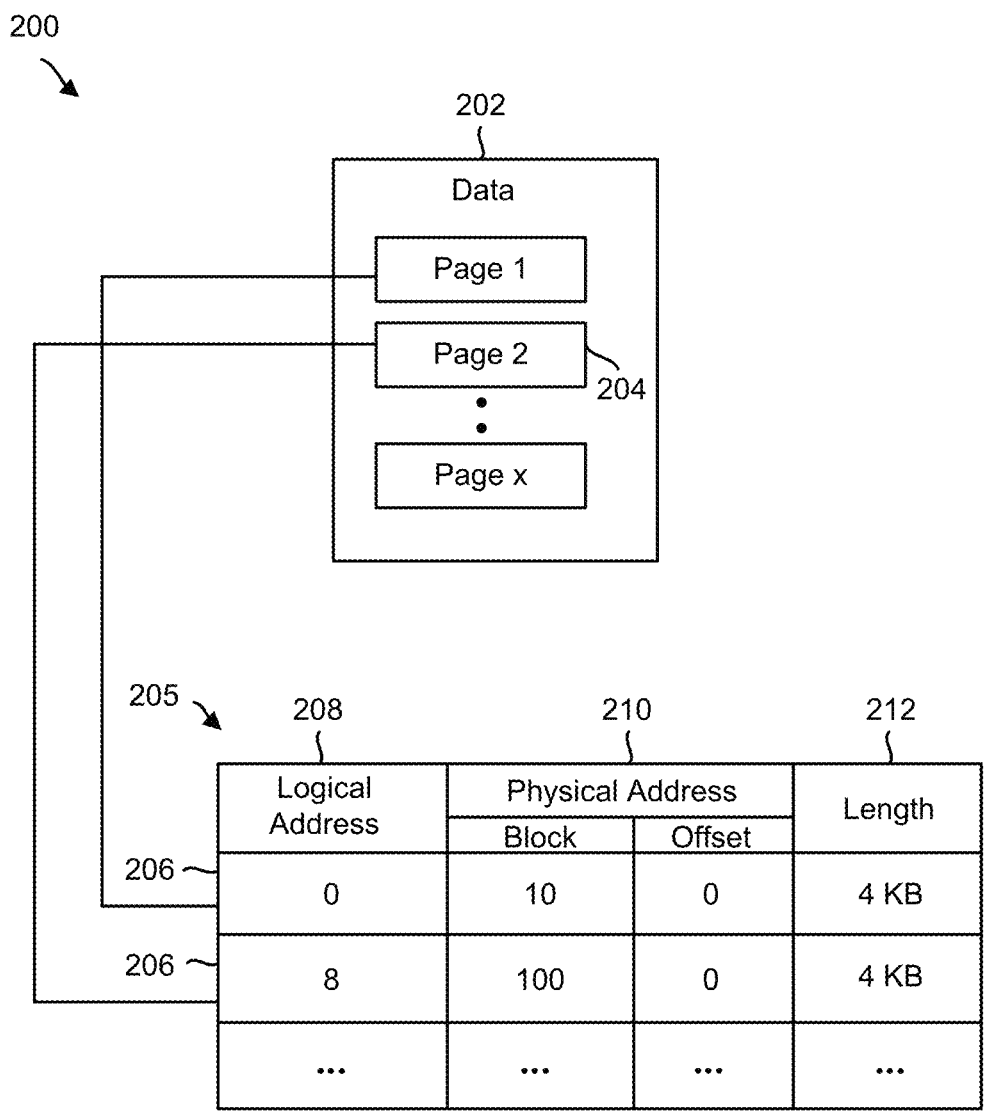
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 illustrating the mapping of data 202 received from a host device to logical addresses and physical addresses in the NVM 110 of FIG. 1. The data 202 may correspond to the data 119 in FIG. 1, while the L2P mapping table 205 may correspond to the L2P mapping table 120 in FIG. 1. In one exemplary embodiment, the data 202 may be stored in one or more pages 204, e.g., pages 1 to x, where x is the total number of pages of data being written to the NVM 110. Each page 204 may be associated with one or more entries 206 of the L2P mapping table 205 identifying a logical block address (LBA) 208, a physical address 210 associated with the data written to the NVM, and a length 212 of the data. LBA 208 may be a logical address specified in a write command for the data received from the host device. Physical address 210 may indicate the block and the offset at which the data associated with LBA 208 is physically written. Length 212 may indicate a size of the written data (e.g., 4 KB or some other size).

Referring back to FIG. 1, the volatile memory 118 also stores a cache 122 for the storage device 102. The cache 122 includes entries showing the mapping of logical addresses specified for data requested by the host 104 to physical addresses in NVM 110 indicating the location(s) where the data is stored. This mapping may be performed by the controller 123. When the controller 123 receives a read command or a write command for data 119, the controller checks the cache 122 for the logical-to-physical mapping of each data. If a mapping is not present (e.g., it is the first request for the data), the controller accesses the L2P mapping table 120 and stores the mapping in the cache 122. When the controller 123 executes the read command or write command, the controller accesses the mapping from the cache and reads the data from or writes the data to the NVM 110 at the specified physical address. The cache may be stored in the form of a table or other data structure which includes a logical address associated with each memory location 112 in NVM where data is being read.

The NVM 110 includes sense amplifiers 124 and data latches 126 connected to each memory location 112. For example, the memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the memory location 112, the sense amplifiers 124 sense the data by amplifying the voltages on the bit lines to a logic level (e.g., readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof.

The controller 123 is configured to receive data transferred from one or more of the cells 116 of the various memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the NVM 110 when reading or writing data to the cells 116. For example, the controller 123 may receive logical-to-physical address mappings from the NVM 110 in response to read or write commands from the host device 104, identify the physical addresses mapped to the logical addresses identified in the commands (e.g., translate the logical addresses into physical addresses), and access or store data in the cells 116 located at the mapped physical addresses.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104 and may be accessed by the controller 123 for execution by the one or more processors of the controller 123. Alternatively, the functions and components of the controller may be implemented with hardware in the controller 123 or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The interface element 106 receives the write command, and the controller allocates a memory location 112 in the NVM 110 of storage device 102 for storing the data. The controller 123 stores the L2P mapping in the NVM (and the cache 122) to map a logical address associated with the data to the physical address of the memory location 112 allocated for the data. The controller also stores the length of the L2P mapped data. The controller 123 then stores the data in the memory location 112 by sending it to one or more data latches 126 connected to the allocated memory location, from which the data is programmed to the cells 116.

The host 104 may retrieve data from the storage device 102 by sending a read command specifying one or more logical addresses associated with the data to be retrieved from the storage device 102, as well as a length of the data to be read. The interface 106 receives the read command, and the controller 123 accesses the L2P mapping in the cache 122 or otherwise the NVM to translate the logical addresses specified in the read command to the physical addresses indicating the location of the data. The controller 123 then reads the requested data from the memory location 112 specified by the physical addresses by sensing the data using the sense amplifiers 124 and storing them in data latches 126 until the read data is returned to the host 104 via the host interface 106.

Figure 3:
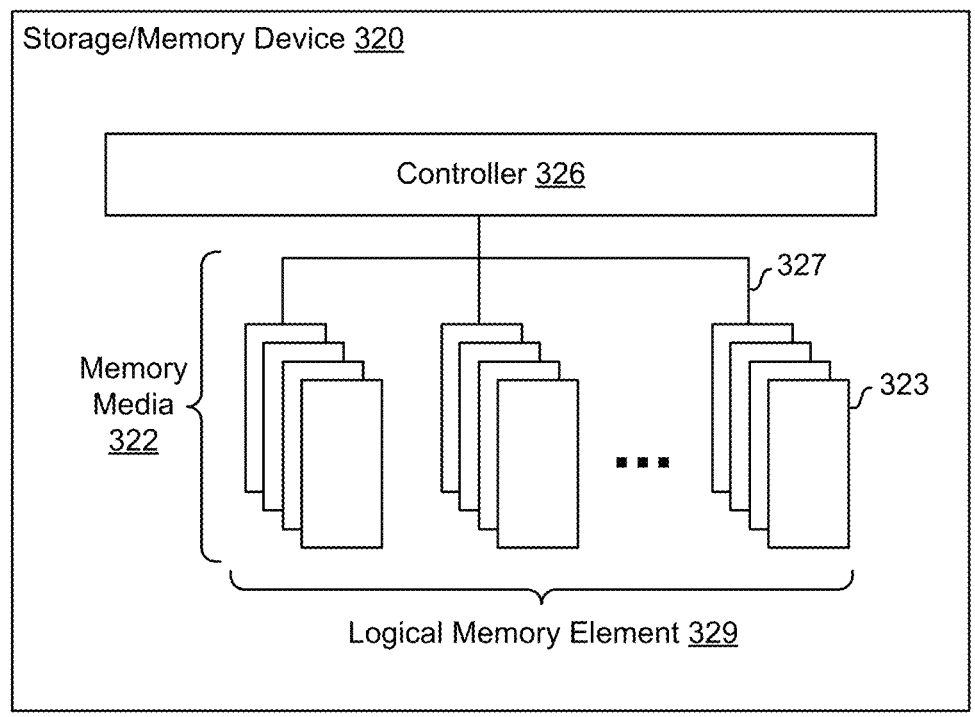
FIG. 3 is a schematic block diagram illustrating an embodiment of a storage/memory device for block relocation operations.

FIG. 3 is a schematic block diagram illustrating an embodiment of a storage/memory device 320 (e.g., the NVM 110 of FIG. 1) for block relocation operations. In some examples, the storage/memory device 320 can at least partially operate on and/or in communication with a host device (e.g., host device 104 of FIG. 1). The storage/memory device 320 can include different types of memory devices including, but not limited to: solid-state storage devices, semiconductor storage devices, SAN storage resources, volatile memory devices, non-volatile memory devices, or the like. The storage/memory device 320 can include one or more controllers 326 (e.g., controller 123 of FIG. 1) and memory media 322 (e.g., cells 116 of FIG. 1).

The controller 326 can be communicatively coupled to the non-volatile memory media 322 by way of a bus 327. The bus 327 can include an I/O bus for communicating data to/from the non-volatile memory blocks 323. The bus 327 can further include a control bus for communicating addressing, and other command and control information to the non-volatile memory blocks 323. In some embodiments, the bus 327 can communicatively couple the non-volatile memory blocks 323 to the non-volatile memory controller 326 in parallel. This parallel access can allow the non-volatile memory blocks 323 to be managed as a group, forming a logical memory block 329. The logical memory block can be partitioned into respective logical memory units (e.g., logical pages) and/or logical memory divisions (e.g., logical blocks). The logical memory units can be formed by logically combining physical memory units of each of the non-volatile memory blocks 323.

Figure 4:
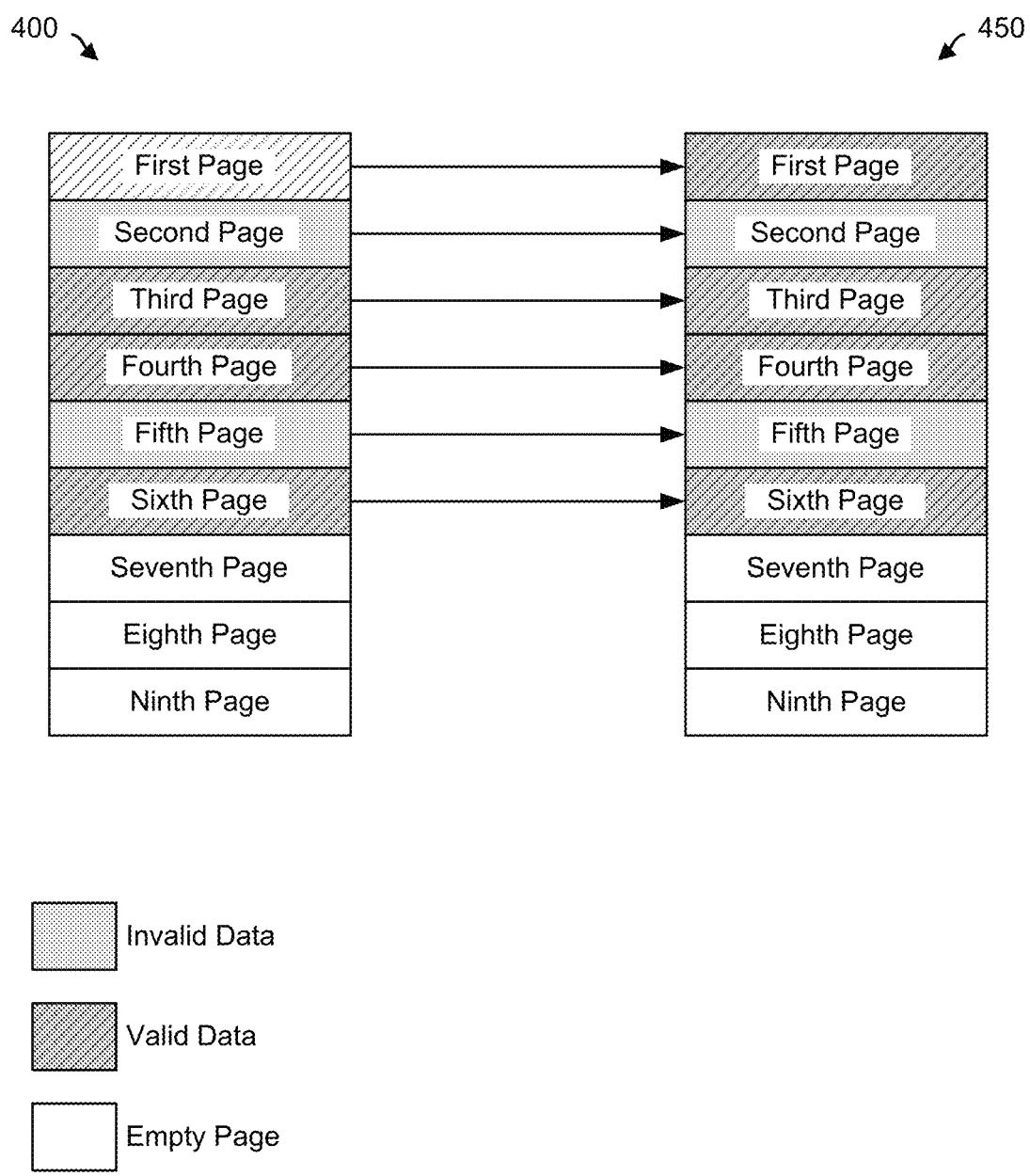
FIG. 4 is a block diagram illustrating an example of blind relocation.

FIG. 4 is a block diagram illustrating an example of blind relocation. The block diagram includes a first block 400 and a second block 450 (e.g., non-volatile memory blocks 323 of FIG. 3), each containing at least nine pages. The first block 400 contains data stored on six of the nine pages, wherein four of the pages include valid data and two of the pages include invalid data. The remaining pages of the first block are empty. Prior to blind relocation, the second block 450 is empty.

In this example, the controller (e.g., controller 326 of FIG. 3) may determine that the first block 400 has a high block error rate (BER). For instance, the second page and the fifth page contain invalid data, which may satisfy a threshold amount of invalid data. In a blind relocation process, the controller may close the first block 400 and open the second block 450. The controller may then copy all the data from the first block 400, including both valid and invalid data, to the second block 450.

It should be noted that such a procedure may take a relatively long time because both invalid and valid data are copied to the second block 450. As discussed in aspects below, this time may be reduced by copying only the valid data to the second block.

Examples of Open Block Relocation

Figure 5:
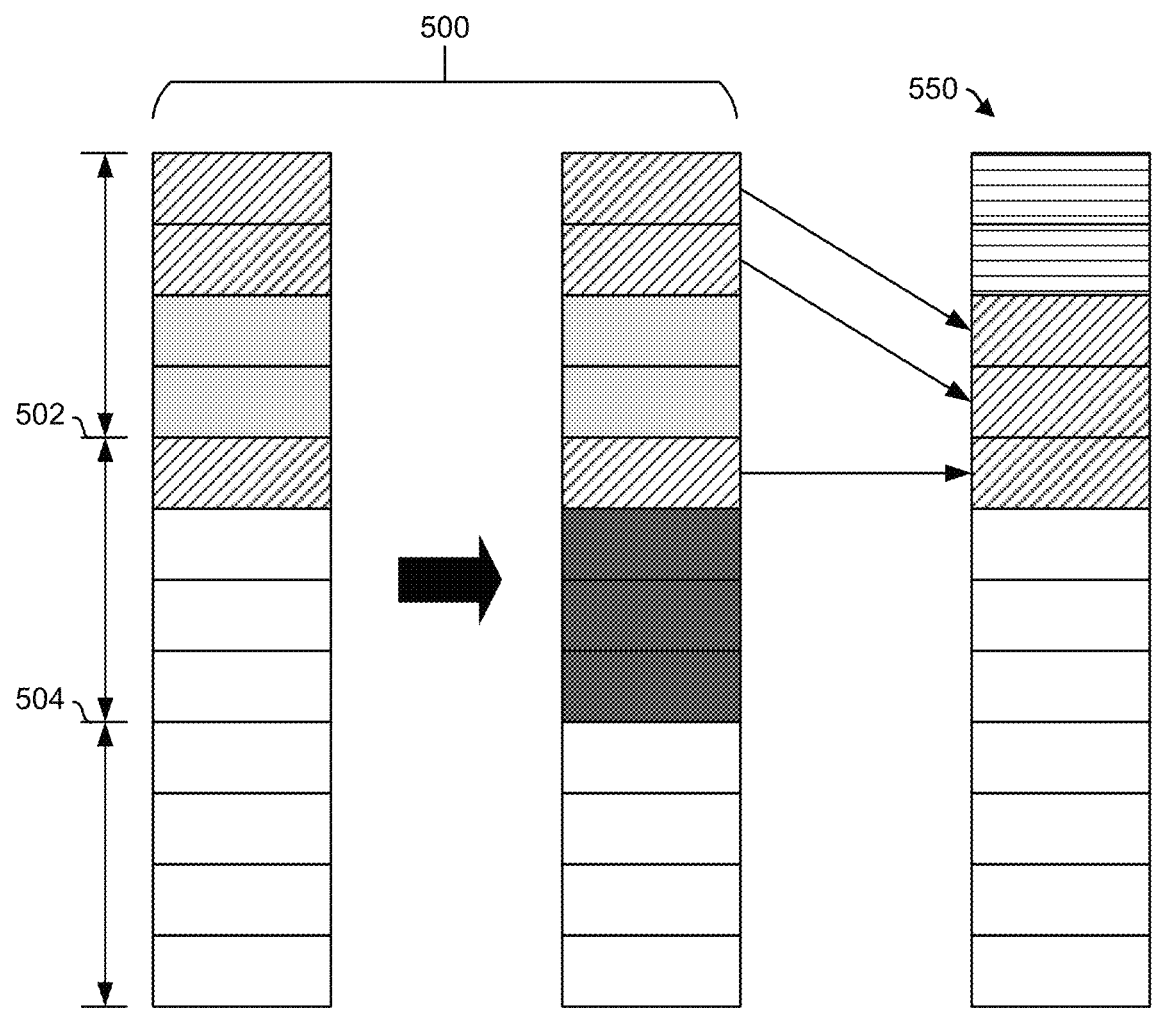
FIG. 5 is a block diagram illustrating an example of open-block relocation.

FIG. 5 is a block diagram illustrating an example of open-block relocation. The block diagram includes a first block 500 and a second block 550 (e.g., non-volatile memory blocks 323 of FIG. 3), each containing at least twelve pages. The first block 500 contains data stored on five of the twelve pages, wherein three of the pages include valid data 508 and two of the pages include invalid data 506. The remaining pages of the first block are empty. Prior to relocation, the second block 550 may be empty or it may already include data. In the illustrated example, the second block 550 is initially empty prior to relocation.

A controller (e.g., controller 326 of FIG. 3) may determine the first block 500 has a high BER. For example, the controller may determine that a threshold BER condition has been met. The determination may trigger the controller to perform a relocation process. Here, the first block 500 still contains at least seven unused pages (e.g., pages that do not contain data). While conventional relocation may require that a block be full or substantially of data prior to closing the block for relocation, the controller may be configured to set one or more partial close block boundaries (e.g., first boundary 502 and second boundary 504) to which data may be filled prior to closing the block. In this manner, a block with a relatively high BER (e.g., a block that meets a threshold condition) may be closed prior to the block being filled. This may reduce the amount of time required to perform the relocation process because the block has less data than a conventional block that must be full or close to it.

Thus, in this example, the controller may set one or more of a first boundary 502 and a second boundary 504 associated with the first block 500. Here, the boundaries occur every four pages. Because there are five pages that contain data, the first boundary 502 cannot be used. Thus, the controller may instead use the second boundary 504. Because there is a three open-page gap between the second boundary 504 and the fifth page, the flash translation layer (FTL) may write dummy data 510 into the three open-page gap. With the aggregate of invalid data 506, valid data 508, and dummy data 510 occupying the first eight pages of the first block 500, the FTL may close the first block, then open a second block 550 (e.g., a previously closed block with or without data stored thereon). The FTL may then write the valid data 508 from the first block 500 to the second block 550 and write any additional data 512 from host write commands to the second block 550. In some example, the additional data 512 of the host write commands may be written to the second block 550 prior to relocation of the valid data 508 to the second block.

In certain aspects, once the FTL closes the first block 500, FTL may accept host writes. Then regular garbage collection flow can pick any source block to reclaim free space or to refresh a block. In some examples, the FTL may select a partially closed block for host writes. In this example, the FTL may distinguish between a partially closed block and a fully closed block because a partially closed block may have different RMAP locations.

Partial close block boundaries (e.g., first boundary 502 and second boundary 504) may be defined by one or more of the following examples.

In a first example, the FTL may write dummy data 510 up to a partial close block boundary defined by a particular data length to protect previously stored data in the first block 500 and ensure generation of an error code and/or parity for any partially written data. That is, a length of the dummy data 510 may be aligned with data lengths associated with an error correction code (ECC) data length, a low-density parity-check code (LDPC) data length, and/or an XOR data length. For example, if the controller generates parity data for every 1 megabyte (MB) of data stored on the first block 500, then the FTL may write dummy data to the first block up to a 1 MB unit. Accordingly, the partial close block boundary is a boundary of the 1 MB unit in this example. For example, if there is 0.5 MB of data in the block, the FTL may add 0.5 MB of dummy data 510 to meet the partial close block boundary (e.g., 1 MB). Once the boundary is met, the block may be closed and the valid data 508 relocated.

XOR may be used for data recovery. In some examples, when an amount of data is determined to be corrupted/invalid, the controller may recover the corrupted data using XOR parity. In one example, the property of XOR may be shown as: A xor B xor C=X. Thus, if A is invalid due to corruption, we can still recover A with B, C, X (e.g., X is XOR parity of A xor B xor C). In other words, because A xor B xor C=X, then B xor C xor X=A. The FTL may manage XOR parity. XOR parity size may be 32 KB, although any suitable number can be used. Thus, the FTL needs XORs predefined multiple pages to have one 32 KB XOR parity. That is, the FTL may ensure that the dummy pages align with the predefined XOR pages.

Although 1 MB is used as an example, any suitable size may be used. In some examples, the hardware and/or firmware configuration of the storage device may define the ECC/LDPC/XOR data lengths. It should be noted that the parity data may be stored in a memory resource separate from the first block. For example, the first block may be used to store data, whereas an auxiliary memory region (e.g., Zarr array, or other metadata storage resource) may be used to store the parity data. Thus, in some examples, the size of the parity data or the XOR data may not count toward the partial close block boundary.

In a second example, the FTL may write dummy data 510 up to a partial close block boundary defined by an indirection mapping unit. That is, a length of the dummy data 510 may be aligned with an indirection mapping unit to be robust in case of a sudden power failure (e.g., an ungraceful shutdown (UGSD)). For example, the FTL may have an indirection mapping unit of 4 kilobytes (KB) data unit, so that every 4 KB has a mapping address. Accordingly, the partial close block boundary is a boundary of the indirection mapping unit of the FTL in this example. That is, the FTL may add dummy data 510 up to the indirection mapping unit. For example, if there is 3 KB of data in the block, the FTL may add 1 KB of dummy data 510 to meet the partial close block boundary (e.g., 4 KB). Although 4 KB is used as an example, any suitable size may be used. If a power failure occurs during a relocation of data from the first block to the second block, upon next mount, the relocation process may continue to write to the second block, or the first block may be used as an open block and the controller may write the host writes to the first block until another high BER is detected at the first block.

In a third example, the FTL may write dummy data 510 up to a partial close block boundary defined by: (i) a physical program boundary (e.g., a page program unit) associated with one or more of a single-level cell (SLC) or multi-level cell (MLC) page program unit, or (ii) a triple-level cell (TLC) or quad-level cell (QLC) NAND layer. For example, a NAND vendor spec may define a physical memory boundary as a page program unit. In other words, data stored in a block may not be read if the data does not fill the block up to the defined physical memory boundary. In certain aspects, the first example and the third example may operate as concurrent partial close block boundaries. For example, the FTL may fill the first block with an amount of dummy data 510 that satisfies both a data length requirement of the first example above, and a physical boundary.

In a fourth example, the FTL may save one or more of dummy data 510 and/or a reverse mapping table (RMAP) in the first block up to a partial close block boundary. The RMAP may be configured to provide a physical to logical mapping table in the first block before the first block is closed. Thus, the FTL may need to use a partial close block boundary that allows provides enough space for the RMAP. For example, if there is not enough space to save the RMAP up to a first physical and/or data length boundary, the FTL may use dummy data so that the RMAP fills the first block up to the next physical and/or data length boundary (e.g., a second physical and/or data length boundary).

In some examples, the controller and/or FTL may relocate only the valid data 508 from the first block 500 to the second block 550, leaving the invalid data 506 and the dummy data/RMAP in the first block 500. The FTL may reuse its garbage collection operations for the relocation process. That is, after the FTL copies all valid data 508 from the partially closed first block 500, it may erase the first block 500 so that it may be used in the future.

Figure 6:
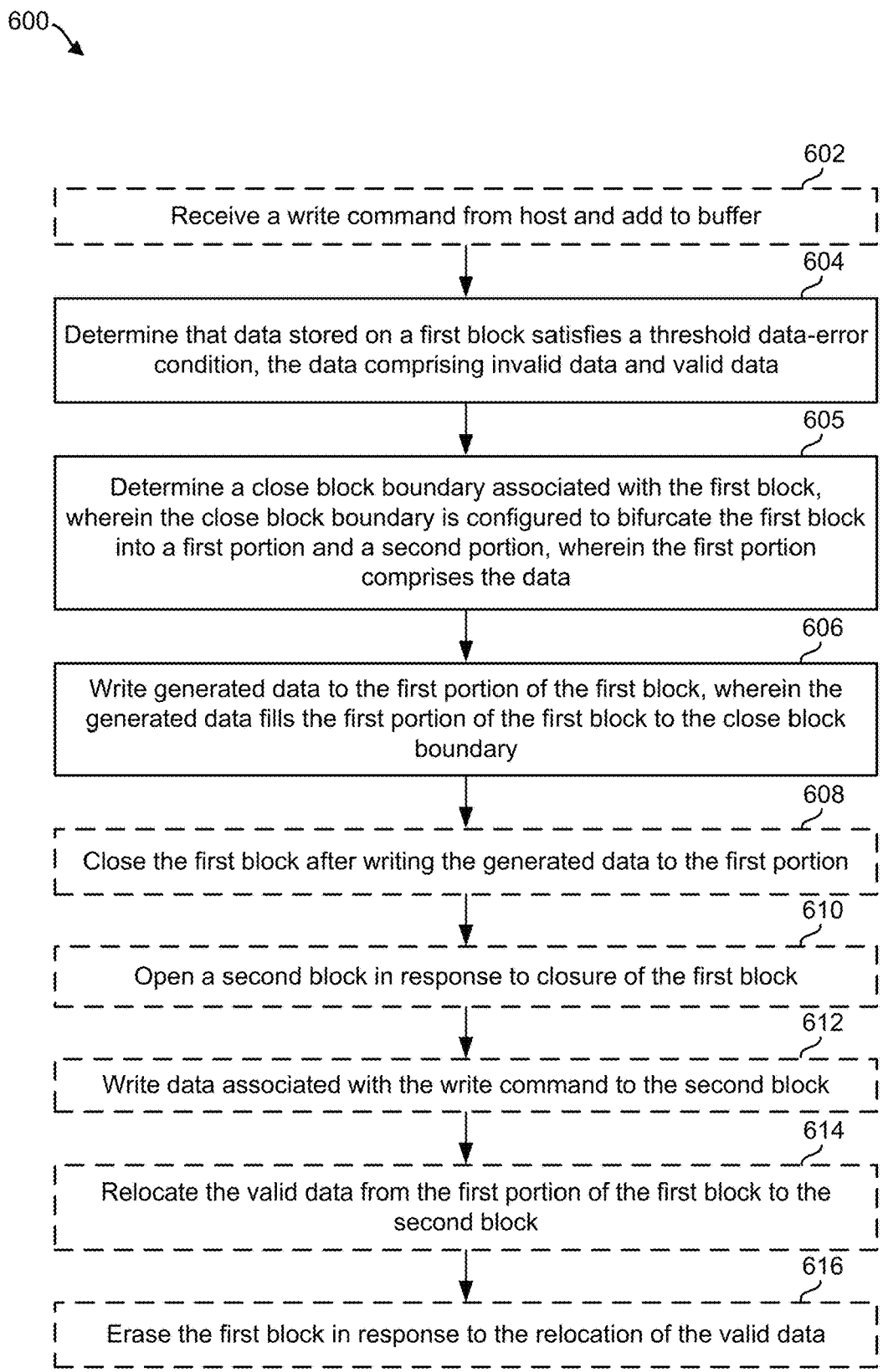
FIG. 6 is a flow diagram illustrating an example method for open block relocation by a storage device.

FIG. 6 is a flow diagram illustrating an example method for open block relocation by a storage device (e.g., storage device 100/320 of FIGS. 1 and 3). At 602, the storage device (e.g., controller 123/326 of FIGS. 1 and 3) may optionally receive a write command from a host (e.g., host device 104) and add the write command to a buffer. In some examples, the write command may trigger the controller to determine whether data stored on an open block satisfies a threshold data-error condition. For example, the controller may determine if a BER of the open block is greater than or equal to a threshold value.

At 604, the controller may determine that data stored on a first block satisfies a threshold data-error condition, wherein the data comprises invalid data and valid data. Here, the first block may be one of one or more open blocks in the storage device used to perform I/O operations. As illustrated in FIG. 5, the stored data may have errors, rendering one or more pages as invalid.

At 605, the controller may determine a close block boundary associated with the first block, wherein the close block boundary is configured to bifurcate the first block into a first portion and a second portion, wherein the first portion comprises the data. For example, the close block boundary (e.g., "partial close block boundary") may be defined by one or more of a data length, a indirection mapping unit, and a physical program boundary, as described above in reference to FIG. 5.

At 606, the controller may write generated data to the first portion of the first block, wherein the generated data fills the first portion of the first block to the close block boundary. For example, the controller may generate dummy data and fill the first block with the dummy data to a certain point. That is, the controller may determine a partial close block boundary and fill a gap of empty memory resources between the stored data and the partial close block boundary with the dummy data. In this way, the controller may close the block to perform garbage collection on the block before the block is fully used.

At 608, the controller may optionally close the first block after writing the generated data to the first portion. That is, the dummy data may be written to the first portion of the block that contains the existing data. The second portion of the block may be empty (e.g., no data stored in the second portion).

At 610, the controller may optionally open a second block in response to closure of the first block. That is, the controller may only be able to open another block if the first block is closed.

At 612, the controller may optionally write data associated with the write command to the second block. For example, prior to relocating the valid data of the first block to the second block, the controller may perform one or more write commands that are currently buffered by writing the data in the second block.

At 614, the controller may optionally relocate the valid data from the first portion of the first block to the second block. That is, the controller may move only the valid data (e.g., not the invalid data) to the second block. By moving only the valid data, the relocation operation may be faster than the blind relocation operation illustrated in FIG. 4.

At 616, the controller may erase the first block in response to the relocation of the valid data. That is, once the valid data has been relocated to the second block, the first block may be erased as part of a garbage collection process.

In certain aspects, the close block boundary is defined by a data length associated with an error detection function.

In certain aspects, the error detection function is an error correction code (ECC), a low-density parity-check code (LDPC), or an XOR function.

In certain aspects, the close block boundary is defined by an indirection mapping unit.

In certain aspects, the close block boundary is defined by a physical boundary of the memory.

In certain aspects, the physical boundary of the memory is defined by one or more of a single-level cell (SLC) or multi-level cell (MLC) physical program boundary, or a triple-level cell (TLC) or quad-level cell (QLC) NAND layer.

In certain aspects, the generated data is dummy data.

In certain aspects, the data error condition is a block error rate (BER) of data stored on the first block.

In certain aspects, the threshold data-error condition is a ratio of valid data to invalid data.

Figure 7:
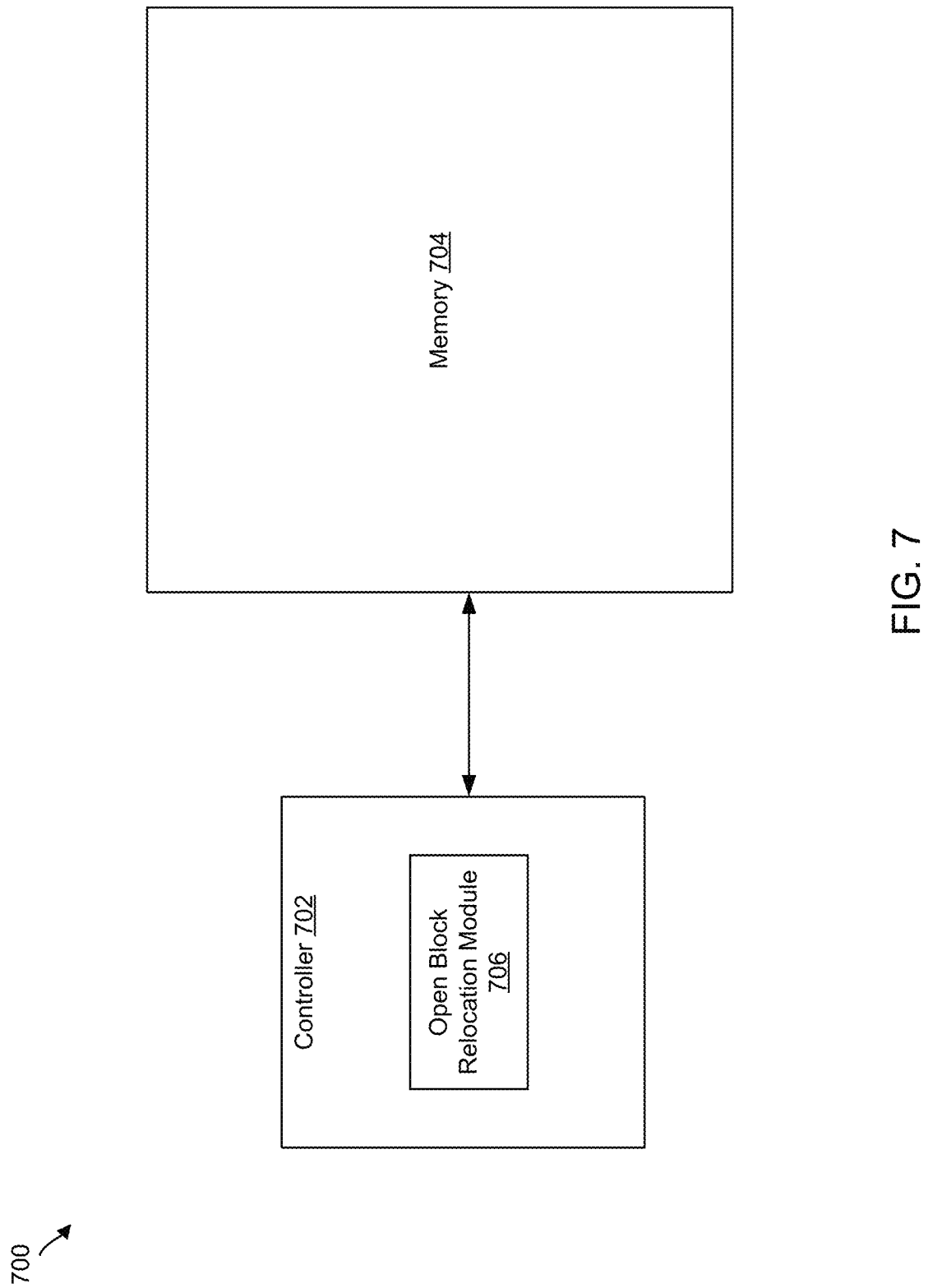
FIG. 7 is a conceptual diagram illustrating an example of a controller configured to perform open block relocation of data stored on a memory.

FIG. 7 is a conceptual diagram illustrating an example of a controller 702 configured to perform open block relocation of data stored on a memory 704. As illustrated in FIG. 7, the controller 702 is coupled to the memory 704 (e.g., NAND) in a storage device 700. For example, controller 702 may correspond to controller 123/326 of FIGS. 1 and 3 and memory 704 may correspond to the NVM 110 of the storage device 102 of FIG. 1 and the memory media 322 of FIG. 3. The controller 702 may be implemented in software, hardware, or a combination of hardware and software. In one exemplary embodiment, the controller is implemented with several software modules executed on one or more processors, but as those skilled in the art will appreciate, the controller may be implemented in different ways. The skilled artisan will readily understand how best to implement the controller based on the particular design parameters of the system.

The storage device 700 may include an open block relocation module 706 configured to provide the means for performing the aforementioned process described in FIG. 6.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
   a memory; and
   a controller coupled to the memory and configured to:
      determine that data stored on a first block satisfies a threshold data-error condition, the data comprising invalid data and valid data;
      determine a close block boundary associated with the first block, wherein the close block boundary is configured to bifurcate the first block into a first portion and a second portion, wherein the first portion comprises the data; and
      write generated data to the first portion of the first block, wherein the generated data fills the first portion of the first block to the close block boundary.

2. The storage device of claim 1, wherein the close block boundary is defined by a data length associated with an error detection function.

3. The storage device of claim 2, wherein the error detection function is an error correction code (ECC), a low-density parity-check code (LDPC), or an XOR function.

4. The storage device of claim 1, wherein the close block boundary is defined by an indirection mapping unit.

5. The storage device of claim 1, wherein the close block boundary is defined by a physical boundary of the memory.

6. The storage device of claim 5, wherein the physical boundary of the memory is defined by one or more of a single-level cell (SLC) or multi-level cell (MLC) physical program boundary, or a triple-level cell (TLC) or quad-level cell (QLC) NAND layer.

7. The storage device of claim 1, wherein the controller is further configured to:
   close the first block after writing the generated data to the first portion;
   open a second block in response to closure of the first block; and
   relocate the valid data from the first portion of the first block to the second block.

8. The storage device of claim 7, wherein the controller is further configured to:
   erase the first block in response to the relocation of the valid data.

9. The storage device of claim 1, wherein the generated data is dummy data.

10. The storage device of claim 1, wherein the data error condition is a block error rate (BER) of data stored on the first block.

11. The storage device of claim 1, wherein the threshold data-error condition is a ratio of valid data to invalid data.

12. A method for open block data relocation in a memory, comprising:
   determining that data stored on a first block satisfies a threshold data-error condition, the data comprising invalid data and valid data;
   determining a close block boundary associated with the first block, wherein the close block boundary is configured to bifurcate the first block into a first portion and a second portion, wherein the first portion comprises the data; and
   writing generated data to the first portion of the first block, wherein the generated data fills the first portion of the first block to the close block boundary.

13. The method of claim 12, wherein the close block boundary is defined by a data length associated with an error detection function.

14. The method of claim 13, wherein the error detection function is an error correction code (ECC), a low-density parity-check code (LDPC), or an XOR function.

15. The method of claim 12, wherein the close block boundary is defined by an indirection mapping unit.

16. The method of claim 12, wherein the close block boundary is defined by a physical boundary of the memory.

17. The method of claim 16, wherein the physical boundary of the memory is defined by one or more of a single-level cell (SLC) or multi-level cell (MLC) physical program boundary, or a triple-level cell (TLC) or quad-level cell (QLC) NAND layer.

18. The method of claim 12, wherein the method further comprises:
   closing the first block after writing the generated data to the first portion;
   opening a second block in response to closure of the first block; and
   relocating the valid data from the first portion of the first block to the second block.

19. The method of claim 18, wherein the method further comprised:
   erasing the first block in response to the relocation of the valid data.

20. A storage device, comprising:
   a memory; and
   a controller coupled to the memory and configured to:
      close a first block based on a satisfies a threshold data-error condition of the first block, wherein the first block comprises invalid data and valid data;
      open a second block in response to closing the first block; and
      relocate the valid data from the first block to the second block.

* * * * *